US010078789B2

(12) United States Patent
Gupta et al.

(10) Patent No.: US 10,078,789 B2
(45) Date of Patent: Sep. 18, 2018

(54) VEHICLE PARKING ASSIST SYSTEM WITH VISION-BASED PARKING SPACE DETECTION

(71) Applicant: MAGNA ELECTRONICS INC., Auburn Hills, MI (US)

(72) Inventors: Nikhil Gupta, Brampton (CA); Eduardo R. Corral-Soto, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 119 days.

(21) Appl. No.: 15/210,223

(22) Filed: Jul. 14, 2016

(65) Prior Publication Data

US 2017/0017848 A1 Jan. 19, 2017

Related U.S. Application Data

(60) Provisional application No. 62/193,914, filed on Jul. 17, 2015.

(51) Int. Cl.
| | |
|---|---|
| *G06K 9/00* | (2006.01) |
| *G08G 1/16* | (2006.01) |
| *G08G 1/0962* | (2006.01) |
| *B60W 30/06* | (2006.01) |
| *G05D 1/02* | (2006.01) |

(52) U.S. Cl.
CPC ......... *G06K 9/00812* (2013.01); *B60W 30/06* (2013.01); *G05D 1/0246* (2013.01); *G06K 9/00798* (2013.01); *G08G 1/0962* (2013.01); *G08G 1/165* (2013.01); *G08G 1/166* (2013.01); *G08G 1/167* (2013.01); *G08G 1/168* (2013.01)

(58) Field of Classification Search
None
See application file for complete search history.

(56) References Cited

U.S. PATENT DOCUMENTS

| 4,891,559 A | 1/1990 | Matsumoto et al. |
|---|---|---|
| 4,892,345 A | 1/1990 | Rachael, III |
| 4,895,790 A | 1/1990 | Swanson et al. |

(Continued)

FOREIGN PATENT DOCUMENTS

| DE | 3248511 | 7/1984 |
|---|---|---|
| DE | 102008049113 | 5/2009 |

(Continued)

*Primary Examiner* — Matthew Bella
*Assistant Examiner* — Brian Shin
(74) *Attorney, Agent, or Firm* — Honigman Miller Schwartz and Cohn, LLP

(57) ABSTRACT

A parking assist system of a vehicle includes a camera that, when disposed at the vehicle, has a field of view exterior of the vehicle. An image processor is operable to process image data captured by the camera to detect parking space markers indicative of a parking space and to identify empty or available parking spaces. The image processor includes a parking space detection algorithm that detects parking space markers by (i) extracting low level features from captured image data, (ii) classifying pixels as being part of a parking space line or not part of a parking space line, (iii) performing spatial line fitting to find lines in the captured images and to apply parking space geometry constraints, and (iv) detecting and selecting rectangles in the captured images.

20 Claims, 3 Drawing Sheets

(56) References Cited

U.S. PATENT DOCUMENTS

| | | |
|---|---|---|
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,359,363 A | 10/1994 | Kuban et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,940,120 A | 8/1999 | Frankhouse et al. |

(56) References Cited

U.S. PATENT DOCUMENTS

| | | |
|---|---|---|
| 5,949,331 A | 9/1999 | Schofield et al. |
| 5,956,181 A | 9/1999 | Lin |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,476,730 B2 | 11/2002 | Kakinami et al. |
| 6,477,464 B2 | 11/2002 | McCarthy et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,672,731 B2 | 1/2004 | Schnell et al. |
| 6,678,056 B2 | 1/2004 | Downs |
| 6,678,614 B2 | 1/2004 | McCarthy et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,744,353 B2 | 6/2004 | Sjönell |
| 6,757,109 B2 | 6/2004 | Bos |
| 6,762,867 B2 | 7/2004 | Lippert et al. |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,825,880 B2 | 11/2004 | Asahi et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,898,495 B2 | 5/2005 | Tanaka et al. |
| 6,909,753 B2 | 6/2005 | Meehan et al. |
| 6,940,423 B2 | 9/2005 | Takagi et al. |
| 6,946,978 B2 | 9/2005 | Schofield |
| 6,947,064 B1 | 9/2005 | Hahn et al. |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,257,486 B2 | 8/2007 | Shimazaki et al. |
| 7,295,227 B1 | 11/2007 | Asahi et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,366,595 B1 | 4/2008 | Shimizu et al. |
| 7,369,940 B2 | 5/2008 | Frank et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,425,076 B2 | 9/2008 | Schofield et al. |
| 7,432,248 B2 | 9/2008 | Schofield et al. |
| 7,526,103 B2 | 4/2009 | Schofield et al. |
| 7,561,181 B2 | 7/2009 | Schofield et al. |
| 7,598,887 B2 | 10/2009 | Sato et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,680,570 B2 | 3/2010 | Mori |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 8,285,479 B2 | 10/2012 | Kawabata et al. |
| 8,451,107 B2 | 5/2013 | Lu et al. |
| 8,874,317 B2 | 10/2014 | Marczok et al. |
| 9,457,717 B2 | 10/2016 | Marczok et al. |
| 9,868,463 B2 | 1/2018 | Marczok et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0080877 A1 | 5/2003 | Takagi et al. |

(56) References Cited

U.S. PATENT DOCUMENTS

| | | |
|---|---|---|
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2004/0130464 A1 | 7/2004 | Schindler et al. |
| 2004/0153243 A1 | 8/2004 | Shimazaki et al. |
| 2005/0134983 A1 | 6/2005 | Lynam |
| 2005/0203704 A1 | 9/2005 | Frank |
| 2005/0285758 A1 | 12/2005 | Matsukawa et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2006/0287825 A1 | 12/2006 | Shimizu et al. |
| 2006/0287826 A1 | 12/2006 | Shimizu et al. |
| 2007/0021881 A1 | 1/2007 | Mori |
| 2007/0104476 A1 | 5/2007 | Yasutomi et al. |
| 2009/0113509 A1 | 4/2009 | Tseng et al. |
| 2010/0013670 A1 | 1/2010 | Hueppauff et al. |
| 2010/0235053 A1 | 9/2010 | Iwakiri et al. |
| 2010/0286872 A1 | 11/2010 | Endo et al. |
| 2013/0046441 A1 | 2/2013 | Marczok et al. |
| 2013/0116859 A1 | 5/2013 | Ihlenburg et al. |
| 2014/0067206 A1 | 3/2014 | Pflug et al. |
| 2014/0112542 A1* | 4/2014 | Choi .................. G06K 9/00812 382/104 |
| 2014/0307083 A1* | 10/2014 | Oh ........................... B60R 1/00 348/118 |
| 2014/0327774 A1* | 11/2014 | Lu ..................... G06K 9/00791 348/148 |
| 2014/0354811 A1 | 12/2014 | Weber |
| 2014/0375476 A1 | 12/2014 | Johnson et al. |
| 2015/0022664 A1 | 1/2015 | Pflug et al. |
| 2015/0042808 A1 | 2/2015 | Pflug et al. |
| 2015/0081174 A1 | 3/2015 | Marczok et al. |
| 2015/0104070 A1* | 4/2015 | Tabb .................. G06K 9/00637 382/104 |
| 2015/0124096 A1 | 5/2015 | Koravadi |
| 2015/0158499 A1 | 6/2015 | Koravadi |
| 2015/0251599 A1 | 9/2015 | Koravadi |
| 2015/0344028 A1 | 12/2015 | Gieseke et al. |
| 2016/0096477 A1 | 4/2016 | Biemer et al. |
| 2016/0137126 A1 | 5/2016 | Fursich et al. |
| 2017/0015312 A1 | 1/2017 | Latotzki |
| 2017/0017847 A1 | 1/2017 | Nakaya et al. |
| 2017/0050672 A1 | 2/2017 | Gieseke et al. |
| 2017/0083774 A1 | 3/2017 | Solar et al. |
| 2017/0169301 A1 | 6/2017 | Kunze |
| 2017/0253237 A1 | 9/2017 | Diessner et al. |
| 2017/0317748 A1 | 11/2017 | Krapf |
| 2017/0329346 A1 | 11/2017 | Latotzki |

FOREIGN PATENT DOCUMENTS

| | | |
|---|---|---|
| EP | 0513476 | 11/1992 |
| EP | 1065642 | 1/2001 |
| EP | 1510442 | 1/2007 |
| EP | 1950097 | 7/2008 |
| EP | 1308346 | 12/2008 |
| EP | 2055536 | 5/2009 |
| FR | 2585991 | 2/1987 |
| FR | 2672857 | 8/1992 |
| FR | 2673499 | 9/1992 |
| GB | 934037 | 8/1963 |
| GB | 2137573 | 10/1984 |
| GB | 2244187 | 11/1991 |
| GB | 2255539 | 11/1992 |
| JP | 55039843 | 3/1980 |
| JP | 58110334 | 6/1983 |
| JP | 58209635 | 12/1983 |
| JP | 59114139 | 7/1984 |
| JP | 5913336 | 9/1984 |
| JP | 6080953 | 5/1985 |
| JP | 60261275 | 11/1985 |
| JP | 6079889 | 10/1986 |
| JP | 62122487 | 6/1987 |
| JP | 62122844 | 6/1987 |
| JP | 6272245 | 8/1987 |
| JP | 6414700 | 1/1989 |
| JP | 01123587 | 5/1989 |
| JP | 30061192 | 3/1991 |
| JP | 4114587 | 4/1992 |
| JP | 40245886 | 9/1992 |
| JP | 50000638 | 1/1993 |
| JP | 05050883 | 3/1993 |
| JP | 05077657 | 3/1993 |
| JP | 5213113 | 8/1993 |
| JP | 06227318 | 8/1994 |
| JP | 07004170 | 1/1995 |
| JP | 07105496 | 4/1995 |
| JP | 02630604 | 4/1997 |
| WO | WO1996021581 | 7/1996 |
| WO | WO2007012516 | 2/2007 |
| WO | WO2008055567 | 5/2008 |

\* cited by examiner

VEHICLE PARKING ASSIST SYSTEM WITH VISION-BASED PARKING SPACE DETECTION

CROSS REFERENCE TO RELATED APPLICATION

The present application claims the filing benefits of U.S. provisional application Ser. No. 62/193,914, filed Jul. 17, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a parking space detection (PSD) algorithm that analyzes input video images of the ground area at or near the equipped vehicle in order to recognize and extract imaged parking lines and rectangular parking areas on the image, and that produces several derived quantities that will be used by an automatic vehicle parking system or parking assist system.

These and other objects, advantages, purposes and features of the present invention will become apparent upon review of the following specification in conjunction with the drawings.

DESCRIPTION OF THE PREFERRED EMBODIMENTS

A parking assist system and/or vehicle vision system and/or driver assist system and/or object detection system and/or alert system operates to capture data exterior of the vehicle and may process the captured data to detect objects at or near the vehicle and in a predicted path of the vehicle, such as to assist a driver of the vehicle in maneuvering the vehicle in a rearward direction or such as to control the vehicle along a determined or selected path of travel. The system may include a plurality of cameras or image sensors and an image processor or image processing system that is operable to receive image data from one or more of the cameras to determine objects or obstacles and the like along the determined path of travel.

Figure 1:
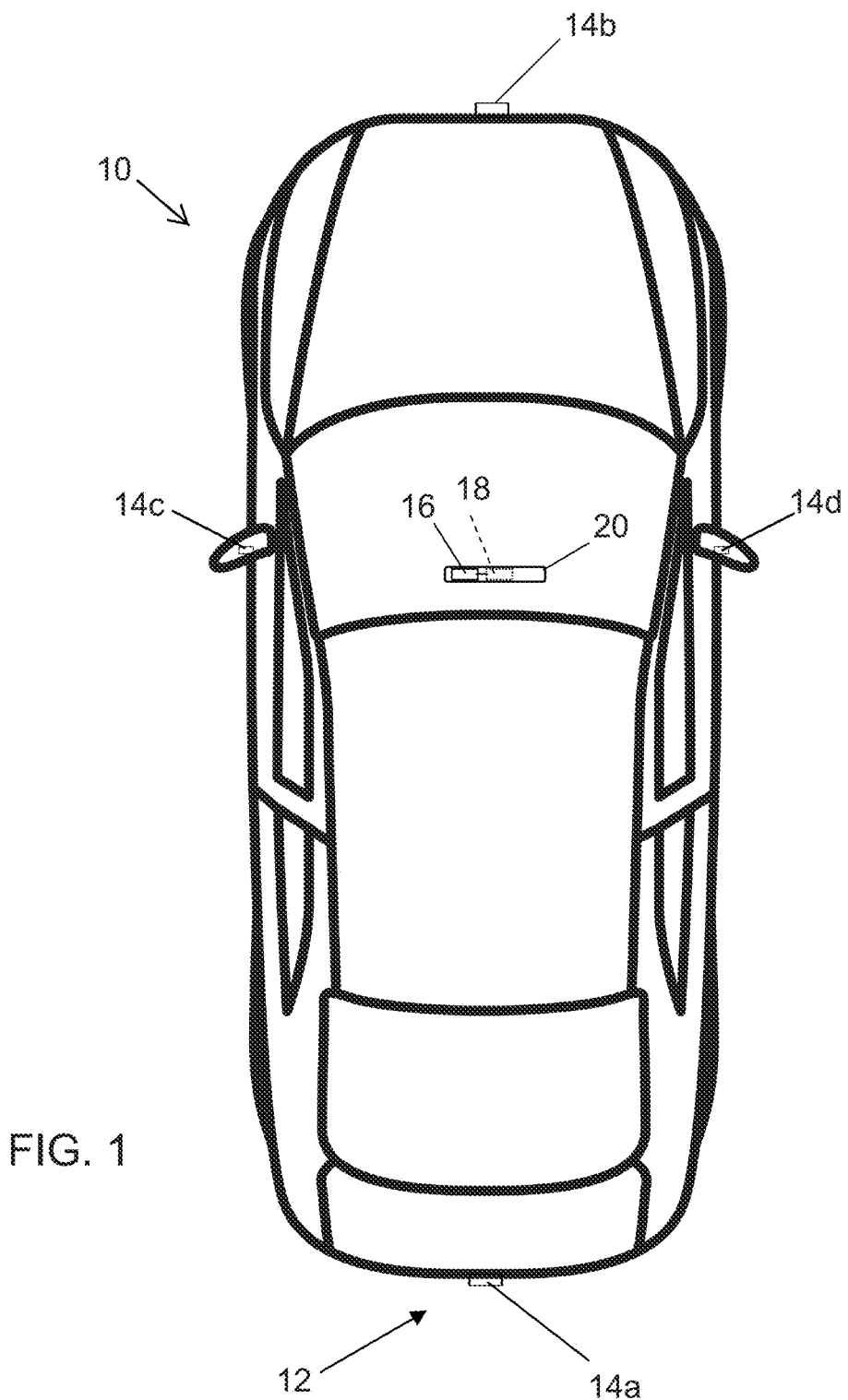
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In recent years, several applications of computer vision techniques have become available in the automotive industry in the form of driver assistance safety features, or even as components of autonomous navigation systems in state-of-the art vehicles. For example, some vehicles include a lane departure warning (LDW) system, which is meant to alert the driver of any potential unintended lane change during the course of a trip.

The present invention provides a computer vision-based parking space detection algorithm functions in conjunction with an automatic vehicle parking system or parking assist system. The purpose of the parking space detection (PSD) algorithm (FIG. 2) is to analyze input video images of the ground area at or near the vehicle in order to recognize and extract the imaged parking lines and rectangular parking areas in the captured images, and produce several derived quantities that will be used by an automatic vehicle parking system when parking the vehicle in one of the detected parking areas or spaces.

The road line sensing algorithm of the present invention has a number of advantages:

Image rectification. This operates on synthetic virtual top view of the ground plane (as opposed to on the default camera view). This greatly simplifies the detection of lines/rectangles because the line's width becomes approximately constant, and the geometry of the parking rectangles becomes undistorted.

Sensitivity. The algorithm works reasonably well even when detecting poor parking lines markers and/or in poor weather conditions such as rain.

Accuracy and robustness. Subjective visual evaluations of the algorithm produce competitive results in terms of sensitivity, accuracy and stability.

Architectural versatility and real-time processing. The algorithm is designed and implemented in a modular way so it can be readily used in many different vehicle applications.

Complementary information. Current auto-parking solutions rely heavily on ultrasonic and radar sensors, as well as point clouds of surrounding vehicles and objects to detect the parking space and park the vehicle. However, with the parking rectangle detection algorithm of the present invention, such systems will benefit greatly from having available parking lines and rectangle space complementary information that will be used to improve existing auto-parking schemes.

The parking lines and rectangle detection algorithm has a number of key components that make it quite competitive in terms of performance and robustness:

Image rectification. It operates on synthetic virtual top view of the ground plane (as opposed to on the default camera view). This greatly simplifies the detection of lines/rectangles because the line's width becomes approximately constant, and the geometry of the parking rectangles becomes undistorted.

Parking rectangle recognition. The algorithm uses a robust well-formulated recursive probabilistic approach to classify the lines and areas of the image that belong to imaged parking rectangles with very high sensitivity, which makes it reasonably robust in poorly marked parking areas and/or in poor weather conditions such as rain.

Parking lines/rectangle geometry enforcement. The algorithm uses geometric constraints to emphasize the detection of valid parking spaces.

Stabilizing stage. The algorithm employs a recursive temporal stabilization mechanism that produces a stable rectangle parking space and allows for a principled way of predicting parking lines and rectangles when they disappear from the image.

Figure 2:
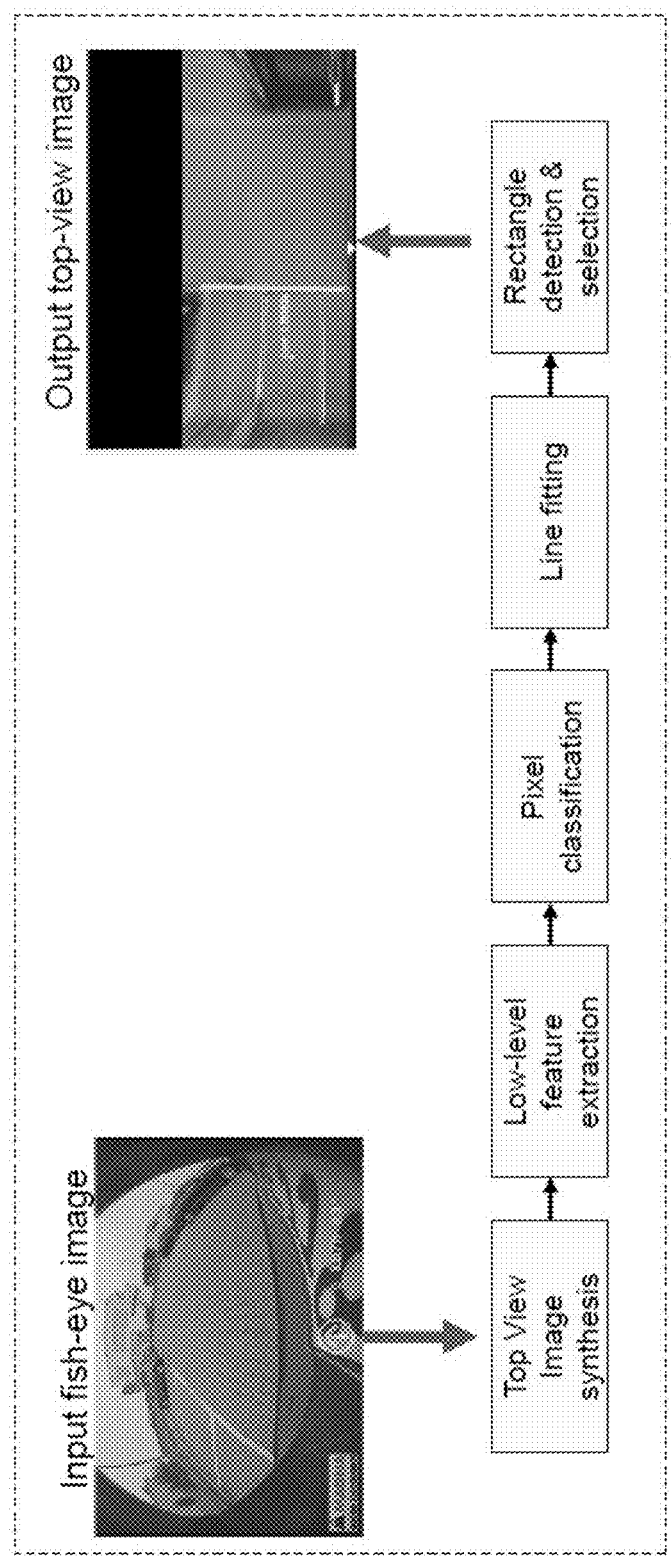
FIG. 2 is a block diagram of a parking rectangle detection algorithm suitable for use in the parking assist system of the present invention.

FIG. 2 shows the stages of the parking lines/rectangle detection algorithm of the present invention. The main stages are: (1) Top view image synthesis from fish-eye image (a corrected top view image of the road is synthesized), (2) Low level image features extraction, (3) Line extraction (Pixel classification and line fitting), and (4) Rectangle detection and selection.

As shown in FIG. 2, the top-view image synthesis stage applies lens distortion correction to the input fish-eye image (such as captured by one of the vehicle cameras, such as a front or rear camera of the vehicle) to produce a virtual top view of the road (image on right side of FIG. 2) by means of a virtual camera. The low-level feature extraction module uses the top-view image to compute low-level features, such as image gradients and pixel-level statistics, which are sent to the probabilistic pixel classification stage in order to classify each pixel as being part of or not being part of a parking space line or marker. The detected road line pixels are then used to perform spatial line fitting in order to find lines in the image and to apply parking geometry constraints, and perform further analysis such as line width estimation and gaps detection along the lines. The detected parking lines are then analyzed by the rectangle detection module to construct hypothesized parking rectangles and select the optimal rectangle (amongst a list of multiple feasible rectangles) using machine learning concepts. Then a recursive temporal stabilization mechanism is used to lock-in to a selected parking rectangle while the vehicle is parking (with the vehicle parking via an associated automated parking system of the vehicle).

Figure 3:
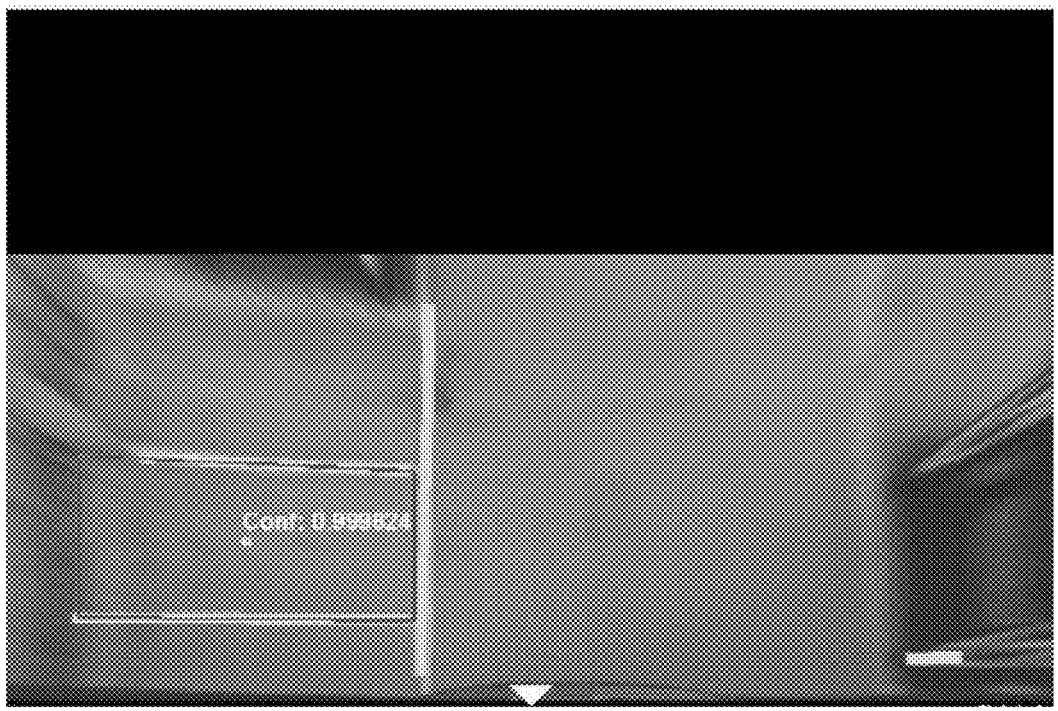
FIG. 3 is a parking space (rectangle) detection example of the parking assist system of the present invention, showing a white triangle at the bottom that symbolizes the location of the camera at the rear of the vehicle, just above the bumper.

The algorithm of the present invention may operate with a single rear fish-eye camera where the camera is looking down at around 45 degrees and imaging a road area of around 10×10 meters, such as shown in FIG. 3.

The following information may potentially be used to identify the algorithm of the present invention:

1. Debug diagrams and or image line/rectangle overlays such as shown in FIGS. 2 and 3.
2. The algorithm may be sensitive and may detect parking lines/rectangles that have relatively low contrast (paint vs. paving colors). Sensitivities between algorithms could be used for comparison purposes. For example, to detect parking lines/rectangles with different contrast levels, or with one of the parking lines with marking gaps.
3. The algorithm estimates/computes the width and length of the rectangle space, together with many other quantities.
4. The algorithm is able to perform reasonably well using grayscale (no color) images (such as 480×720 and 400×640 pixelated grayscale images or the like). This could be useful while comparing algorithms with such grayscale images.
5. The algorithm detects parking spaces at any orientation and on different surface shapes (not necessarily planar). In such situations, the parking spaces may not actually look like rectangles, but the algorithm is still able to find them although they are not perfect rectangles.

Based on market information, the current auto-parking solutions rely heavily on ultrasonic and radar sensors, as well as point clouds of surrounding vehicles and objects to detect the parking space and park the vehicle. However, with the parking rectangle detection algorithm of the present invention, such automated parking systems will benefit greatly from having available parking lines and rectangle space complementary information that will be used to improve existing auto-parking schemes. For example, the existing auto-parking systems cannot detect the parking space if there are no cars parked on the neighbor spaces because there would not be any point clouds or sensor responses to allow for the detection of the parking space. However, with the algorithm of the present invention, the parking space on the ground would be detected.

The parking assist system that utilizes the parking space detection algorithm or system of the present invention may utilize aspects of the systems described in U.S. Pat. No. 8,874,317 and/or U.S. Publication Nos. US-2015-0344028; US-2015-0251599; US-2015-0158499; US-2015-0124096; US-2014-0375476 and/or US-2013-0116859 and/or U.S. patent application Ser. No. 15/206,801, filed Jul. 11, 2016, which are all hereby incorporated herein by reference in their entireties.

The parking assist system may have a camera or other environmental sensors (such as, for example, infrared cameras, ultrasound sensors, time of flight (TOF) sensors, LIDAR sensors, RADAR sensors or gray level transition sensors (such as described in U.S. Publication No. US-2016-0096477, which are hereby incorporated herein by reference in their entireties) and sensor or data processing system. Optionally, the vehicle may have devices for remote data communication (radio waves, optically, acoustically).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A parking assist system of a vehicle, said parking assist system comprising:
a camera configured to be disposed at a vehicle, wherein said camera, when disposed at the vehicle, has a field of view exterior of the vehicle;
a control comprising an image processor operable to process image data captured by said camera when said camera is disposed at the vehicle;
wherein said control, responsive to processing by said image processor of captured image data, detects parking space markers indicative of a parking space and identifies empty or available parking spaces;
wherein said control uses a parking space detection algorithm that detects parking space markers by (i) extracting low level features from captured image data, (ii) classifying pixels as being part of a parking space line or not part of a parking space line, (iii) performing spatial line fitting to find lines in the captured images and to apply parking space geometry constraints, and (iv) detecting and selecting rectangles in the captured images;
wherein said parking space detection algorithm employs a recursive temporal stabilization mechanism that predicts parking space markers when the parking space markers of a detected parking space disappear from the field of view of said camera; and
wherein said control, responsive to identification of an empty or available parking space, at least in part controls the vehicle to park the vehicle in the identified empty or available parking space.

2. The parking assist system of claim 1, wherein said camera comprises a pixelated imaging array having a plurality of photosensing elements.

3. The parking assist system of claim 2, wherein said camera comprises a grayscale camera.

4. The parking assist system of claim 1, wherein the detected rectangles are processed to construct hypothesized parking rectangles, whereby said parking space detection algorithm selects an optimal rectangle using machine learning concepts.

5. The parking assist system of claim 1, wherein said camera comprises a front camera and wherein said image processor processes image data captured by said front camera to detect parking space markers indicative of a parking space forward of the vehicle and to identify empty or available parking spaces forward of the vehicle.

6. The parking assist system of claim 1, wherein said camera is part of a multi-camera vision system of the vehicle, and wherein said multi-camera vision system comprises a plurality of cameras disposed at the vehicle so as to have respective fields of view exterior the vehicle.

7. The parking assist system of claim 6, wherein said plurality of cameras comprises a front camera disposed at a forward portion of the vehicle and having a field of view forward of the vehicle, a driver-side camera disposed at a driver side of the vehicle and having a field of view sideward of the vehicle, a passenger-side camera disposed at a passenger side of the vehicle and having a field of view sideward of the vehicle, and a rear camera disposed at a rear portion of the vehicle and having a field of view rearward of the vehicle.

8. The parking assist system of claim 7, wherein said image processor processes image data captured by at least one of said front camera and said rear camera to detect parking space markers indicative of a parking space and to identify empty or available parking spaces.

9. The parking assist system of claim 1, wherein the recursive temporal stabilization mechanism produces a stable rectangle parking space and predicts rectangle parking spaces when the parking space markers of a detected parking space disappear from the field of view of said camera.

10. A parking assist system of a vehicle, said parking assist system comprising:
a plurality of cameras configured to be disposed at a vehicle so as to have respective fields of view exterior of the vehicle;
a control comprising an image processor operable to process image data captured by said cameras when said cameras are disposed at the vehicle;
wherein said control, responsive to processing by said image processor of captured image data, (i) detects parking space markers indicative of a parking space and (ii) identifies empty or available parking spaces; and
wherein said control uses a parking space detection algorithm that detects parking space markers by (i) extracting low level features from captured image data, (ii) classifying pixels as being part of a parking space line or not part of a parking space line, (iii) performing spatial line fitting to find lines in the captured images and to apply parking space geometry constraints, and (iv) detecting and selecting rectangles in the captured images;
wherein said parking space detection algorithm employs a recursive temporal stabilization mechanism that predicts parking space markers when the parking space markers of a detected parking space disappear from the field of view of said cameras; and
wherein said control, responsive to identification of an empty or available parking space, at least in part controls the vehicle to park the vehicle in the identified empty or available parking space.

11. The parking assist system of claim 10, wherein each of said cameras comprises a pixelated imaging array having a plurality of photosensing elements.

12. The parking assist system of claim 11, wherein each of said cameras comprises a grayscale camera.

13. The parking assist system of claim 10, wherein the detected rectangles are processed to construct hypothesized parking rectangles, whereby said parking space detection algorithm selects an optimal rectangle using machine learning concepts.

14. The parking assist system of claim 10, wherein said image processor processes image data captured by at least one of a front camera of said plurality of cameras and a rear camera of said plurality of cameras to detect parking space markers indicative of a parking space forward or rearward of the vehicle and to identify empty or available parking spaces forward or rearward of the vehicle.

15. The parking assist system of claim 10, wherein said cameras are part of a multi-camera vision system of the vehicle, and wherein image data captured by said cameras is used to provide a surround vision display for viewing by the driver of the vehicle.

16. The parking assist system of claim 10, wherein said plurality of cameras comprises a front camera disposed at a forward portion of the vehicle and having a field of view forward of the vehicle, a driver-side camera disposed at a driver side of the vehicle and having a field of view sideward of the vehicle, a passenger-side camera disposed at a passenger side of the vehicle and having a field of view sideward of the vehicle, and a rear camera disposed at a rear portion of the vehicle and having a field of view rearward of the vehicle.

17. The parking assist system of claim 10, wherein the recursive temporal stabilization mechanism produces a stable rectangle parking space and predicts rectangle parking spaces when the parking space markers of a detected parking space disappear from the field of view of said cameras.

18. A parking assist system of a vehicle, said parking assist system comprising:
- a plurality of cameras configured to be disposed at a vehicle so as to have respective fields of view exterior of the vehicle;
- wherein said plurality of cameras comprises at least a front camera disposed at a forward portion of the vehicle and having a field of view forward of the vehicle, and a rear camera disposed at a rear portion of the vehicle and having a field of view rearward of the vehicle;
- an image processor operable to process image data captured by said front and rear cameras when said cameras are disposed at the vehicle;
- wherein said image processor processes captured image data to (i) detect parking space markers indicative of a parking space and (ii) identify empty or available parking spaces;
- wherein said image processor comprises a parking space detection algorithm that detects parking space markers by (i) extracting low level features from captured image data, (ii) classifying pixels as being part of a parking space line or not part of a parking space line, (iii) performing spatial line fitting to find lines in the captured images and to apply parking space geometry constraints, and (iv) detecting and selecting rectangles in the captured images;
- wherein the detected rectangles are processed to construct hypothesized parking rectangles, whereby said parking space detection algorithm selects an optimal rectangle using machine learning concepts;
- wherein said parking space detection algorithm employs a recursive temporal stabilization mechanism that produces a stable rectangle parking space and that predicts parking lines and rectangles when the parking space markers of a detected parking space disappear from the field of view of said cameras; and
- a control that, responsive to identification of an empty or available parking space, at least in part controls the vehicle to park the vehicle in the identified empty or available parking space.

19. The parking assist system of claim 18, wherein each of said cameras comprises a pixelated imaging array having a plurality of photosensing elements, and wherein each of said cameras comprises a grayscale camera.

20. The parking assist system of claim 18, wherein the detected rectangles are processed to construct hypothesized parking rectangles, whereby said parking space detection algorithm selects an optimal rectangle using machine learning concepts.

* * * * *